United States Patent
Anand et al.

(10) Patent No.: US 10,230,653 B2
(45) Date of Patent: Mar. 12, 2019

(54) MANAGING LATENCIES IN DATA CENTER INTERCONNECT SWITCHES USING SPARE LINE SIDE BANDWIDTH AND MULTIPLE PATHS INSIDE THE DATA CENTER

(71) Applicant: Infinera Corporation, Sunnyvale, CA (US)

(72) Inventors: Madhukar Anand, Fremont, CA (US); Ramesh Subrahmaniam, Fremont, CA (US); Stuart Elby, Chester, NJ (US)

(73) Assignee: Infinera Corporation, Sunnyvale, CA (US)

( * ) Notice: Subject to any disclaimer, the term of this patent is extended or adjusted under 35 U.S.C. 154(b) by 258 days.

(21) Appl. No.: 15/372,869

(22) Filed: Dec. 8, 2016

(65) Prior Publication Data

US 2018/0167333 A1    Jun. 14, 2018

(51) Int. Cl.

| | |
|---|---|
| *G06F 15/16* | (2006.01) |
| *H04L 12/873* | (2013.01) |
| *H04L 29/08* | (2006.01) |
| *H04L 25/03* | (2006.01) |
| *H04L 12/801* | (2013.01) |
| *H04L 12/26* | (2006.01) |
| *H04L 12/24* | (2006.01) |

(52) U.S. Cl.
CPC ............. *H04L 47/52* (2013.01); *H04L 25/03* (2013.01); *H04L 41/12* (2013.01); *H04L 43/0852* (2013.01); *H04L 43/0888* (2013.01); *H04L 47/10* (2013.01); *H04L 67/10* (2013.01)

(58) Field of Classification Search
CPC .. H04L 25/03; H04L 43/0876–43/0888; H04L 47/10; H04L 47/122; H04L 47/20; H04L 47/22–47/225; H04L 47/50–47/52; H04L 2012/568; H04L 2012/6489
See application file for complete search history.

(56) References Cited

U.S. PATENT DOCUMENTS

| | | | | |
|---|---|---|---|---|
| 2004/0174883 | A1* | 9/2004 | Johansson | ............. H04L 45/302 370/395.31 |
| 2008/0316924 | A1* | 12/2008 | Yazaki | ................... H04L 47/10 370/230.1 |

OTHER PUBLICATIONS

Mohammad Alizadeh, Albert Greenberg, David A. Maltz, Jitendra Padhye, Parveen Patel, Balaji Prabhakar, Sudipta Sengupta, and Murari Sridharan, Data Center TCP, SIGCOMM 2010, Aug. 30-Sep. 3, 2010, New Delhi India.

(Continued)

*Primary Examiner* — Brendan Y Higa
(74) *Attorney, Agent, or Firm* — David L. Soltz

(57) ABSTRACT

Systems, methods, and devices for managing latency in a network with a plurality of switches, each switch having client side ports and line side ports. A required bandwidth for each link between connected pairs of the plurality of switches is received. A client-side capacity value for each switch is received. An initial undersubscription factor is calculated based on the required bandwidths and the client-side capacity values. A desired undersubscription factor is calculated for each switch based on the initial undersubscription factor and the client side capacity values. A desired bandwidth is calculated for each link between connected pairs of the plurality of switches based on the required bandwidths and the desired undersubscription factors.

20 Claims, 12 Drawing Sheets

(56) References Cited

OTHER PUBLICATIONS

Hong Zhang, Kai Chen, Wei Bai, Dongsu Han, Chen Tian, Hao Wang, Haibing Guan, and Ming Zhang. 2015. Guaranteeing deadlines for inter-datacenter transfers. In Proceedings of the Tenth European Conference on Computer Systems (EuroSys '15). ACM, New York, NY, USA, Article 20 , 14 pages. DOI=http://dx.doi.org/10.1145/2741948.2741957.
Dixit, P. Prakash, Y. C. Hu, and R. R. Kompella. On the Impact of Packet Spraying in Data Center Networks. In Proc. of INFOCOM, 2013.
Mohammad Alizadeh, Abdul Kabbani, Tom Edsall, Balaji Prabhakar, Amin Vandat, and Masato Yasuda. 2012. Less is more: trading a little bandwidth for ultra-low latency in the data center. In Proceedings of the 9th USENIX conference on Networked Systems Design and Implementation (NSDI'12). USENIX Association, Berkeley, CA, USA, 19-19.

* cited by examiner

| DCI # | 1 | 2 | 3 | 4 |
|---|---|---|---|---|
| 1 | 0 | 500 | 200 | 200 |
| 2 | 500 | 0 | 250 | - |
| 3 | 200 | 250 | 0 | 600 |
| 4 | 200 | - | 600 | 0 |

*FIG. 7*

Inter-DC Traffic Matrix (Target BW)

| DCI # | 1 | 2 | 3 | 4 |
|---|---|---|---|---|
| 1 | 0 | 500 | 100 | 400 |
| 2 | 500 | 0 | 300 | - |
| 3 | 100 | 300 | 0 | 500 |
| 4 | 400 | - | 500 | 0 |

Optimization Output

| DCI # | 1 | 2 | 3 | 4 |
|---|---|---|---|---|
| 1 | 0 | 615 | 100 | 485 |
| 2 | 615 | 0 | 420 | - |
| 3 | 100 | 420 | 0 | 680 |
| 4 | 485 | - | 680 | 0 |

*FIG. 11*

MANAGING LATENCIES IN DATA CENTER INTERCONNECT SWITCHES USING SPARE LINE SIDE BANDWIDTH AND MULTIPLE PATHS INSIDE THE DATA CENTER

FIELD OF INVENTION

The disclosed embodiments are generally related to communications networking and data center interconnect.

BACKGROUND

Network data centers are facilities which typically house computer systems (e.g., banks of servers) and telecommunications equipment used to allow the computer systems to communicate among each other and with other data centers via fiber optic links. Network data centers typically communicate via a data center interconnect (DCI) device which interfaces the data center (DC) to a computer communications network. For example, a DCI may include one or more network switches which provide interconnectivity within the DC, transmit outbound traffic from the DC over a long haul fiber optic cable to another DC, and transmit inbound traffic from another DC to the equipment inside the DC. Network traffic that transits a DCI can be broadly classified into three categories based on latency requirements—(a) delay-sensitive, short flow interactive traffic, (b) larger transfers which require delivery within certain time period, and (c) background traffic that is more throughput-sensitive; i.e., which require a number of messages to be delivered successfully within a given time.

Packet buffering in the DCI affects all traffic flows; however, the impact on time sensitive short flows can be severe if such flows are queued behind long flows in the buffer. In order to meet timeliness guarantees of such a diverse stream of flows, it has been posited that buffer occupancies should be persistently low while maintaining throughput. Conventional equipment however fails to keep buffer occupancies low globally. For example, trading off network bandwidth to reduce latency has been proposed within data centers, however these techniques are application specific, require hardware modifications, and do not consider global constraints across flows and devices. Accordingly, using current techniques, improving latency at one data center in this way can increase buffering in other connected data centers.

SUMMARY

Some embodiments provide a method for a network with a plurality of switches, each switch having client side ports and line side ports. A required line-side capacity value for each link between connected pairs of the plurality of switches is received. A client-side capacity value for each switch is received. An initial undersubscription factor is calculated based on the required line-side capacity values and the client-side capacity values, the undersubscription factor indicating a ratio of line-side capacity to client-side capacity. A desired undersubscription factor is calculated for each switch based on the initial undersubscription factor and the client side capacity values. A desired line-side capacity value is calculated for each link between connected pairs of the plurality of switches based on the required line-side capacity values and the desired undersubscription factors. A line-side capacity of at least one of the links between connected pairs of the plurality of switches is resized based on the desired line-side capacity value.

In some embodiments the connected pairs of the plurality of switches comprise all possible pairs of the switches. Resizing the line-side capacity of at least one of the links between connected pairs of the plurality of switches includes transmitting at least one of the desired line-side capacity values to a bandwidth resizing device to cause the bandwidth resizing device to resize the line-side capacity allocated in the network between at least one of the pairs of switches. An indication of a topology of each switch corresponding to the client-side capacity value may be received. The bandwidth resizing device may include a wavelength division multiplexer. At least a portion of the method may be carried out by a bandwidth management device. The bandwidth management device may include or be co-located with a switch. At least a portion of the method may be carried out by a plurality of bandwidth management devices.

Some embodiments provide a bandwidth management device. The bandwidth management device includes processing circuitry and receiver circuitry in communication with a computer communications network configured to receive a required line-side capacity value for each link between connected pairs of a plurality of switches. The receiver circuitry is also configured to receive a client-side capacity value for each switch. The processing circuitry is configured to calculate an initial undersubscription factor based on the required line-side capacity values and the client-side capacity values, the undersubscription factor indicating a ratio of line-side capacity to client-side capacity. The processing circuitry is also configured to calculate a desired undersubscription factor for each switch based on the initial undersubscription factor and the client side capacity values. The processing circuitry is also configured to calculate a desired line-side capacity value for each link between connected pairs of the plurality of switches based on the required bandwidths and the desired undersubscription factors; and the processing circuitry is also configured to resize a line-side capacity of at least one of the links between connected pairs of the plurality of switches based on the desired line-side capacity value.

In some embodiments the connected pairs of the plurality of switches comprise all possible pairs of the switches. The bandwidth management device can also include transmitter circuitry configured to transmit at least one of the desired line-side capacity values to a bandwidth resizing device to cause the bandwidth resizing device to resize the line-side capacity allocated in the network between at least one of the pairs of switches. The receiver circuitry may also be configured to receive an indication of a topology of each switch corresponding to the client-side capacity value. The bandwidth resizing device may include a wavelength division multiplexer. The transmitter and receiver circuitry may be configured to communicate with another bandwidth management device. The bandwidth management device may include or be co-located with a switch. The bandwidth management device may include circuitry distributed among several data center interconnect devices.

Some embodiments provide a non-transitory computer readable medium on which instructions are stored which when executed by a processor of a network device in a network with a plurality of switches, each side having client side ports and line side ports, cause the network device to receive a required line-side capacity value for each link between connected pairs of the plurality of switches. A client-side capacity value is received for each switch. An initial undersubscription factor is calculated based on the required line-side capacity values and the client-side capacity values, the undersubscription factor indicating a ratio of line-side capacity to client-side capacity. A desired undersubscription factor is calculated for each switch based on the initial undersubscription factor and the client side capacity values. A desired line-side capacity value is calculated for each link between connected pairs of the plurality of switches based on the required line-side capacity values and the desired undersubscription factors. A line-side capacity of at least one of the links between connected pairs of the plurality of switches is resized based on the desired line-side capacity value.

In some embodiments, the connected pairs of the plurality of switches comprise all possible pairs of the switches. Resizing the line-side capacity of at least one of the links between connected pairs of the plurality of switches can include transmitting at least one of the desired line-side capacity values to a bandwidth resizing device to cause the bandwidth resizing device to resize the line-side capacity allocated in the network between at least one of the pairs of switches. The non-transitory computer readable medium may also include instructions which when executed by the processor cause the network device to receive an indication of a topology of each switch corresponding to the client-side capacity value. The bandwidth resizing device may include a wavelength division multiplexer. The bandwidth management device may include or be co-located with a switch. The non-transitory computer readable medium may also include instructions which when executed by a processor of a network device cause the network device to transmit a plurality of messages each including at least one of the desired client-side capacity values for one of the pairs of switches to a different bandwidth resizing device such that each of the bandwidth resizing devices are caused to resize the bandwidth allocated in the network between at least one of the pairs of switches.

BRIEF DESCRIPTION OF THE DRAWINGS

FIG. 7 is a matrix showing initial bandwidth requirement values for the example topology shown in FIG. 6.

FIG. 11 is a matrix illustrating desired bandwidth requirement values for the values of FIG. 9.

DETAILED DESCRIPTION OF THE PREFERRED EMBODIMENT(S)

Figure 1:
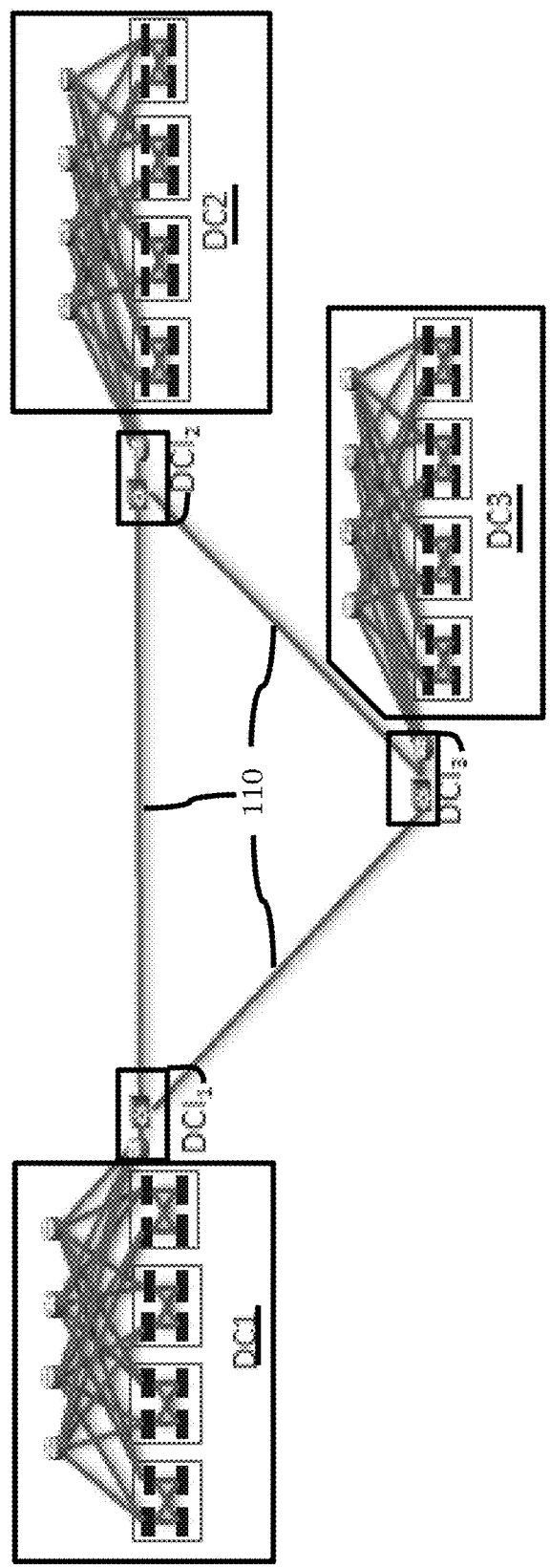
FIG. 1 is a block diagram showing an example reference topology for illustrating management of latency in data center interconnect.

Systems, methods, and devices are discussed herein for reducing latency in a network which includes a plurality of data center interconnect (DCI) devices. A target value for line-side capacity (which is expressed in terms of bandwidth herein for the sake of example only) between connected pairs of the plurality of DCI devices can be calculated, and client-side capacity values (which are expressed in terms of bandwidth herein for the sake of example only) for each DCI device can be used to optimize the line-side capacity (which is expressed in terms of bandwidth herein for the sake of example only). For each connected pair of the plurality of DCI devices, an initial undersubscription factor can be calculated which minimizes client-to-line traffic buffering for that pair of DCI devices, and a new undersubscription factor can be calculated which is as close as possible to the first undersubscription value without exceeding the client-side capacity value of any of the plurality of DCI devices. The new undersubscription factor can be used to yield an optimized bandwidth value for each pair of DCI devices. Instead of buffering data within the DCI, which can increase delays or latency in the traffic passing through the DCI, the DCI can be configured to provide spare capacity on the line side, such that the line side capacity is greater than the client side capacity. The amount of spare capacity can be expressed as an undersubscription value, which is a ratio of line side capacity to client side capacity. A target undersubscription value for each connected pair of DCIs is first calculated based on an initial target line-side bandwidth without reference to global constraints; i.e., without considering its effect on other DCIs in the network. A desired undersubscription value can then be calculated using all of the target values and client side capacity for all of the DCIs. In order to distribute capacity to other DCIs in the network so that none receives an excessive amount of traffic, the calculated undersubscription value may then be used to calculate a desired line-side bandwidth the other DCIs in the network. Accordingly, each DCI has a sufficient amount of spare capacity to carry traffic that would otherwise be buffered and delayed in the DCIs without creating excess line-to-client traffic which would increase buffering in other DCIs. Techniques discussed herein achieve global optimization, as opposed to locally (switch-centric) optimized values, by including the target line-side bandwidth and client-side capacity values from all DCIs in the network in a calculation of optimized line-side bandwidth values for the system. These techniques can dynamically adapt to changing traffic patterns between DCI switches by updating target bandwidth values and using bandwidth resizing devices to dynamically apply globally optimized line-side bandwidth values. Because the optimization inputs only bandwidth values and outputs bandwidth adjustments which are effected using bandwidth resizing devices, it is not necessary to deploy special packet hardware, and the technique is flow- and application-agnostic.

FIG. 1 is a block diagram showing an example reference topology 100 for illustrating an example management of latency in data center interconnect. Reference topology 100 includes three data centers, DC1, DC2, and DC3. Data centers DC1, DC2, and DC3 are each connected to a computer communications network 110 via data center interconnect DCI1, DCI2, and DCI3 respectively. It is noted that this topology and its components are exemplary only, and various alternative topologies and components will be evident to those having skill in the art.

Computer communications network 110 can include any suitable medium or combination of media for transporting data among the data centers DC1, DC2, DC3. For example, computer communications network 110 can include the Internet or portions thereof. Computer communications network 110 can instead or additionally include a fiber-optic transport layer, or any other suitable transport layer.

Data center interconnect DCI1, DCI2, and DCI3 each include circuitry and other components configured to interface each DC1, DC2 and DC3 with one another over computer communications network 110, as further described herein.

Figure 2:
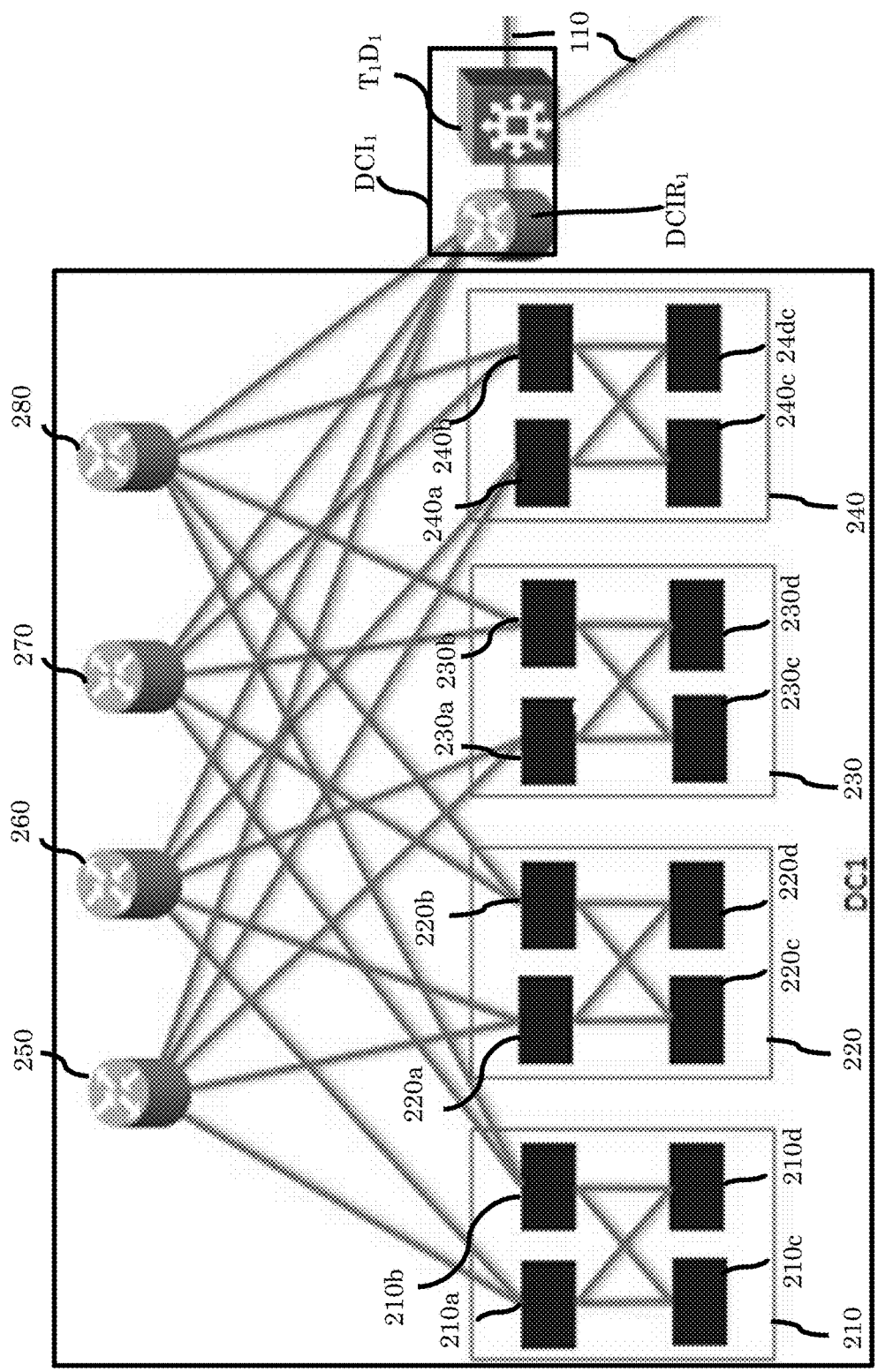
FIG. 2 is a block diagram further illustrating a data center as shown in FIG. 1 and its corresponding data center interconnect.

FIG. 2 is a block diagram further illustrating data center DC1 and its corresponding data center interconnect DCI1. DCI2 and DCI3, as shown and described with respect to FIG. 1, may include the same or similar components and interconnect.

DCI1 includes racks 210, 220, 230, 240, and switches 250, 260, 270, 280. Each of racks 210, 220, 230, 240 includes access switching devices or circuits. Rack 210 includes access switching devices 210a, 210b, 210c, 210d. Rack 220 includes access switching devices 220a, 220b, 220c, 220d. Rack 230 includes access switching devices or circuits 230a, 230b, 230c, 230d. Rack 240 includes access switching devices 240a, 240b, 240c, 240d. Racks 210 220, 230, and 240 may also include server devices connected to the access switching devices, or server devices may be communicatively coupled to the access switching devices from remote locations via any suitable computer communications medium.

Access switching devices can include any suitable device capable of interfacing servers, other computing devices, and/or other communications devices. Server devices can include any suitable computer server. Such servers can include one or more processing devices and local or remote memory, including non-transitory computer-readable memory.

Switches 250, 260, 270, 280 can include any suitable switching devices for aggregating traffic from the access switching devices in racks 210, 220, 230, 240. In one example, switches 250, 260, 270, 280 form nodes of the spine of a spine-and-leaf topology within DCI1, and are interconnected in a full mesh with the access switching devices in racks 210, 220, 230, 240, which form the leaf nodes of the spine-and-leaf topology of DCI1 (i.e., each leaf node connects to each spine node in the topology). It is noted that this topology within DCI1 is only exemplary, and that other topologies are possible, such as tree-and-leaf. Switches 250, 260, 270, 280 each connect to a DCI routing device DCIR1.

DCIR1 can include any suitable routing device or devices capable of receiving traffic from and transmitting traffic to Switches 250, 260, 270, 280. DCIR1 aggregates outbound traffic (i.e., traffic destined for a different data center, or "client-to-line" traffic) from the switches 250, 260, 270, 280 (and from racks 210, 220, 230, 240 via switches 250, 260, 270, 280) and passes this traffic to other data centers (e.g., DC2, DC3) over computer communications network 110 via a transport interface device TID1. DCIR1 also aggregates inbound traffic (i.e., traffic destined for DC1 from one or more other data centers) from TID1 and passes this traffic to switches 250, 260, 270, 280 for distribution to racks 210, 220, 230, 240.

TID1 may include any suitable computer communications and/or transport network interface device, such as a packet-optical router. TID1 is configured to interface DCIR1 to other data centers (e.g., DC2, DC3) via computer communications network 110. TID1 is configured to receive inbound traffic (i.e., traffic from other data centers destined for DC1, or "line-to-client" traffic) over computer communications network 110 and pass this traffic to DCIR1. TID1 is also configured; to transmit outbound traffic (i.e., traffic from DC1 to one or more other data centers, or "client-to-line" traffic) over computer communications network 110 from DCIR1.

In a similar way, data center interconnect, DCI2, and DCI3 can each include a DCI router DCIR2, DCIR3 configured to interface with the devices in the respective DC2, DC3, and a transport interface device TID2, TID3 configured to interface the respective router DCIR2, DCIR3 with the computer communications network 110.

Figure 3:
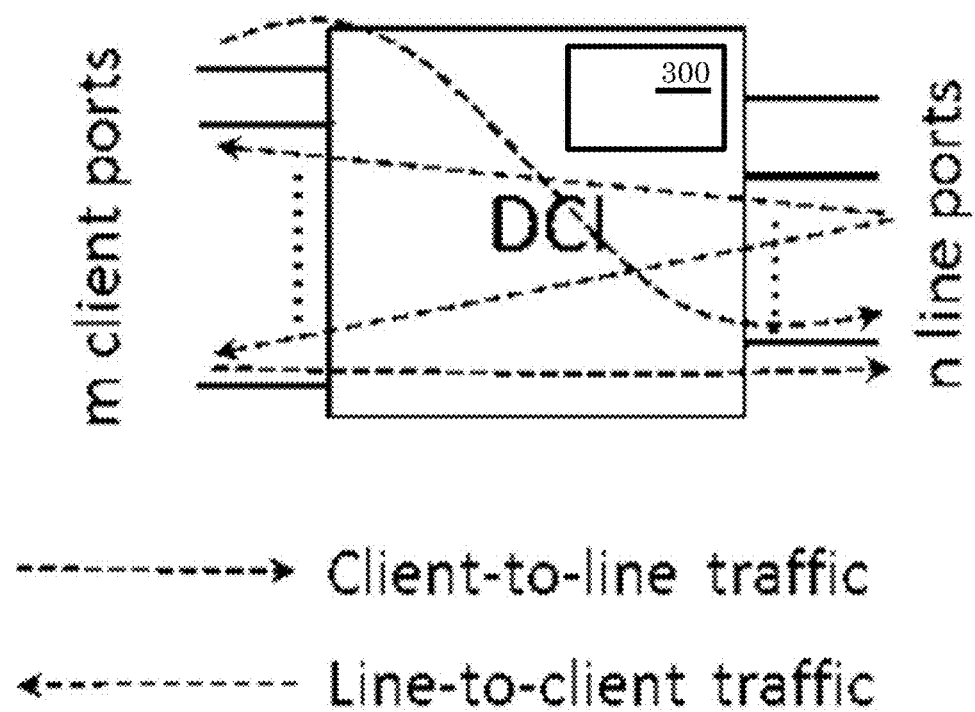
FIG. 3 is a block diagram illustrating a high level view of the data center interconnect shown in FIG. 2.

The precise topology and equipment within each data center and data center interconnect may vary. Accordingly, FIG. 3 is a block diagram illustrating a high level view of DCI1 (which is also applicable to DCI2 and DCI3). DCI1 includes m client ports (i.e., facing the data center DC1) and n line ports (i.e., facing other data centers, e.g., via computer communication network 110 and TID1.) DCI1 also includes a memory circuit or buffer 300 that may temporarily store data or traffic that is transmitted through the DCI. Client-to-line side traffic is aggregated from the m client ports by DCI1 to be transmitted to one or more of then line side ports as shown. Line-to-client side traffic is aggregated from the n line ports by DCI1 to be transmitted to one or more of the m client side ports as shown.

Buffer 300 can be used, for example, to buffer client-to-line side traffic in cases where the amount of traffic coming from the data center (DC1 in this example) exceeds the capacity of the DCI and/or the bandwidth of the line to move traffic to other data centers. As discussed above, this may have an adverse impact on delay-sensitive traffic. Simply buffering traffic can increase its latency, and queuing delay-sensitive traffic in the buffer behind large transfers can increase its latency further still.

One possible approach to addressing this problem is to undersubscribe the DCI. Namely, if the capacity of the DCI to move traffic to other data centers (i.e., line-side bandwidth) is increased such that it exceeds the capacity of the DCI to receive traffic from the DC (i.e., client-side bandwidth), the DCI can be said to be undersubscribed, to thereby reduce the need to buffer the client-to-line side traffic in the DCI.

Undersubscription can be described in terms of the ratio of outgoing capacity to incoming capacity of the DCI being greater than one. This ratio can be referred to as an undersubscription factor. Outgoing capacity in this context refers to the ability of the DCI to move traffic from the DC to other data centers (e.g., from DCI1 to DC2 and/or DC3 via computer communications network 110—the "line" in this case), while incoming capacity in this context refers to the ability of the DCI to input traffic from the DC (e.g., from DC1—the "client" in this case).

Put another way, when undersubscribed, the aggregate capacity of the line side of DCI1 shown with respect to FIG. 3 is greater than the aggregate capacity of the client side. If DCI1 can move more traffic to the line from the n line ports in a given period of time than it can move from the client to the m client ports, then the ratio of outgoing capacity to incoming capacity is greater than one, and DCI1 is undersubscribed.

Undersubscribing a DCI trades off bandwidth for buffers for handling traffic in either direction. The concept of undersubscription is to allocate a fraction of the bandwidth to send an extra burst of traffic instead of storing the packets that make up the traffic. It may seem that it would be advantageous to maximize the undersubscription of DCI1, as the spare bandwidth created on the line side can be used to carry bits as fast as possible from DCI1 to the remote end of the line (i.e., to another DCI), alleviating client-to-line side buffering at DCI1. However, viewed globally from the perspective of other DCIs in the system, maximizing the undersubscription of DCI1 can result in buffering and latency in those other DCIs. Accordingly, it may be desired to calculate a desired undersubscription factor which does not unacceptably increase latency in other DCIs. This can be referred to as globally optimizing the undersubscription factor.

Global optimization of the undersubscription factor can incorporate constraints relating to the handling of line-to-client side traffic at each DCI. In other words, the way in which traffic is moved from the line side ports of each DCI into its data center can be included in the global optimization of the undersubscription factor.

One approach to distributing line-to-client traffic from a DCI into the data center is packet spraying. Using packet spraying, traffic entering the DCI from the line side is sprayed (e.g., distributed randomly, or deterministically) to all of its client side ports. For example, referring to FIG. 2, Packet spraying is a multi-path distribution technique that can yield high bi-section bandwidth within the data center. Bi-section bandwidth is a metric which can be useful for quantifying worst-case bandwidth among the nodes of a network, such as within the data center. It is noted that random spraying of packets across the multiple paths making up the bi-section bandwidth can be demonstrated not to create excessive packet re-ordering (i.e., packets belonging to a flow arriving out of order, which can degrade performance) in the case of an undersubscribed switch, the higher line-side bandwidth can reduce buffering of client-to-line side traffic, and multipathing (e.g., packet spraying) can reduce buffering of line-to-client side traffic [How?]. For example, referring to FIG. 2, traffic leaving DCI1 via DCI1 is less likely to be buffered in DCI1 if the line-side bandwidth is greater than the bandwidth on the client side (i.e., if DCI1 is undersubscribed). In the other direction, a traffic flow entering DC1 from DCI1 is less likely to be buffered in DCI1 if it can be transmitted via any of switches 250, 260, 270, and 280 than if it is constrained to transit the same switch. Calculating the desired undersubscription factor, in the context of packet spraying, can thus incorporate constraints relating to packet spraying, such as the inbound capacity of each DCI in the system (i.e., of the client ports).

In order to describe an example approach to calculating the desired undersubscription factor, assume a network of switches $DCI_1 \ldots DCI_n$ that are interconnected with a device that allows for line bandwidth between switches to be resized (i.e., increased or decreased), such as Instant Bandwidth (iBW) technology available from Infinera®, Sunnyvale, Calif. Such a device can be referred to as a DCI bandwidth resizing device. Such a device can resize line-side bandwidth, for example, by setting up appropriate channels (such as dedicated optical channels each having a different wavelength, such as those that constitute a wavelength division multiplexed (WDM) optical signal transmitted on an optical fiber) across the DCI. Such devices may include a switch or multiplexer which allows additional line-side bandwidth to be provisioned on demand to increase the total line-side bandwidth, and may be incorporated into or feed into the line side of the DCI. For example, line bandwidth resizer 310 is located on the line side of DCI1 as shown in FIG. 3.

In the descriptions that follow, the function $\delta(i,j)$ denotes whether two DCI switches are connected or not. In other words, $\delta(i,j)=1$ if $DCI_i$ and $DCI_j$ are connected, and 0 if they are not. Let P(i) denote the number of client side ports at the switch $DCI_i$, F(i,j) denote the number of ports sending traffic from $DCI_i$ to $DCI_j$, C(i,k) denote the capacity of $k^{th}$ client port on switch $DCI_i$, L(i,j) denote the line side bandwidth requirement between $DCI_i$ to $DCI_j$ and $B(i,j,u,\sigma)$ denote the buffer size to accommodate σ-percentile traffic from $DCI_i$ to $DCI_j$ with undersubscription u from $DCI_i$ and $DCI_j$. Buffer size to accommodate σ percentile traffic refers to the amount of buffer space needed to handle up to σ percent of traffic. For example, if the buffering requirement with σ=0.9 is 5 MB, then 90% of traffic will need 5 MB or less of buffering, and the other 10% will need more. This can be a useful measure due to the exponential nature of buffering requirements. As σ approaches 1 (i.e., as the percentage of traffic considered approaches all traffic), an increasing amount of buffering capacity will be needed to handle all traffic. Accordingly, handling all 100% of cases without dropping traffic would require a large amount of buffer space.

The desired undersubscription of each link between $DCI_i$ to $DCI_j$ can be calculated using the following steps.

Firstly, calculate $u_{i,j}^*(>1)$ the initial target undersubscription factor on switch $DCI_i$ that minimizes buffering requirements i.e., $$u_{i,j}^* \left( \sum_{k=1}^{F(i,j)} c(i,k) \right)$$

is the new net line side bandwidth out of $DCI_i$ towards $DCI_j$ that results in the least packet buffering requirements on switch $DCI_i$.

Min $u^*$ (Equation 1)

Such that:

$$\frac{B(i, j, u^*, \sigma) - B(i, j, 1, \sigma)}{u^* - 1} \leq$$

$$\beta \max_u \frac{B(i, j, u, \sigma) - B(i, j, 1, \sigma)}{u - 1}$$

$\beta \geq 1$, is a fixed constant, $u^* > 1$

As a second step, consider the traffic demand from $DCI_i$ to every other switch $DCI_j$ and compute the largest possible value of u based on $u_{i,j}^*$ but which is subject to the capacity constraints on each of the involved switches. The optimization problem is:

$$\text{Min.} \sum_{\forall (i,j), i \neq j}^{1 \leq i \leq n, 1 \leq j \leq n} (u_{i,j} b_{i,j} - u_{i,j}^* b_{i,j})^2 - \alpha \sum_{\forall (i,j), i \neq j}^{1 \leq i \leq n, 1 \leq j \leq n} u_{i,j} b_{i,j} \quad \text{(Equation 2)}$$

Subject to.

$$\sum_{i=2}^{n} u_{i,1} * b_{i,1} * \delta(i, 1) \leq \sum_{k=1}^{P(1)} C(1, k) \quad \text{(Equation 3)}$$

(Inbound capacity constraints on $DCI_1$)

...

$$\sum_{i=1}^{n-1} u_{i,n} * b_{i,n} * \delta(i, n) \le \sum_{k=1}^{P(n)} C(n, k)$$

(Inbound capacity constraints on $DCI_n$)

$$\sum_{i=2}^{n} u_{1,i} * b_{1,i} * \delta(1, i) \le \sum_{k=1}^{P(1)} C(1, k)$$

(Outbound capacity constraints on $DCI_1$)
...

$$\sum_{i=1}^{n-1} u_{n,i} * b_{n,i} * \delta(n, i) \le \sum_{k=1}^{P(n)} C(n, k)$$

(Outbound capacity constraints on $DCI_n$)

$\forall (i, j) : u_{i,j} b_{i,j} \le L(i, j)$ (Link capacity constraints on link $DCI_i - DCI_j$)

$u_{1,2} \ge 1, \ldots, u_{n-1,n} \ge 1$

Where a>1 is a constant weight factor and $b_{i,j}$ is the bandwidth requirement on link between DCI I and $DCI_j$ (Equation 4)

(Equation 5)

(Equation 6)

Here, the objective function minimizes the variance of all undersubscription factors around their optimal values, and the constraints capture capacity limitations of each DCI switch. For instance, on $DCI_1$ the net incoming traffic from other DCI switches is $$\sum_{i=2}^{n} u_{i,1} \delta(i, 1) \sum_{k=1}^{F(i,1)} C(1, k).$$

This net incoming traffic should be at most equal to the outgoing capacity available on every client port on $$DCI_1 = \sum_{k=1}^{P(1)} C(1, k)).$$

The steps discussed above can be expressed using an algorithm:

---

1. For every pair of switches ($DCI_i$, $DCI_j$ )do:
   $u_{i,j}^*$ (>1) ← the initial target undersubscription factor on switch $DCI_i$ that minimizes buffering requirements for traffic going from $DCI_i$ and $DCI_j$.
2. A ← {$u_{1,2} \ge 1$, ..., $u_{n,n-1} \ge 1$} // Initial set of constraints (Equation 8)

3. For every switch of $DCI_j$ switch do:

$$A \leftarrow A \cup \left\{ \sum_{i=1}^{n} u_{i,j} * b_{i,j} * \delta(i, j) \le \sum_{k=1}^{P(j)} C(j, k) \right\}$$

// Net traffic coming into $DCI_j$ should not exceed the available capacity of all ports on client side (Equation 9)

$$A \leftarrow A \cup \left\{ \sum_{i=1}^{n} u_{j,i} * b_{j,i} * \delta(j, i) \le \sum_{k=1}^{P(j)} C(j, k) \right\}$$

// Net traffic going out of $DCI_j$ should not exceed the available capacity of all ports on line side (Equation 10)

4. For every link $DCI_i$ - $DCI_j$ switch do
   A ← A U {$\forall (i, j) : u_{i,j} b_{i,j} \le L(i,j)$}
   //(Link capacity constraints on link $DCI_i$ - $DCI_j$)

(Equation 11)

5. Obj ←

$$\text{Min.} \sum_{\forall (i,j), i \ne j}^{1 \le i \le n, 1 \le j \le n} (u_{i,j} b_{i,j} - u_{i,j}^* b_{i,j})^2 - \alpha \sum_{\forall (i,j), i \ne j}^{1 \le i \le n, 1 \le j \le n} u_{i,j} b_{i,j}$$

//Objective is to ensure undersubscription factors are close enough to their unconstrained optimal values (Equation 12)

6. {$u_{1,2}'$, ..., $u_{n,n-1}'$} ← QUADRATIC_OPTIMIZATION_SOLVER(Obj, A)
   // minimize Obj subject to constraints A using a quadratic optimization solver (Equation 13)

7. For every switch of $DCI_j$ set line side bandwidth to $DCI_j$ to be $L(i,j) * u_{i,j}'$ (Equation 14)

In the steps above, it is noted that ← is a programming assignment operation. Regarding step 6, QUADRATIC_OPTIMIZATION_SOLVER can indicate any solver that takes the objective function Obj along with the set of constraints A and returns desired undersubscription values, which can be described as optimized (or close to optimal) values with respect to initial target undersubscription factors $\{u_{i,2}', \ldots, u_{n,n-1}'\}$. Any suitable solver may be used for solving the quadratic optimization problem.

Figure 4:
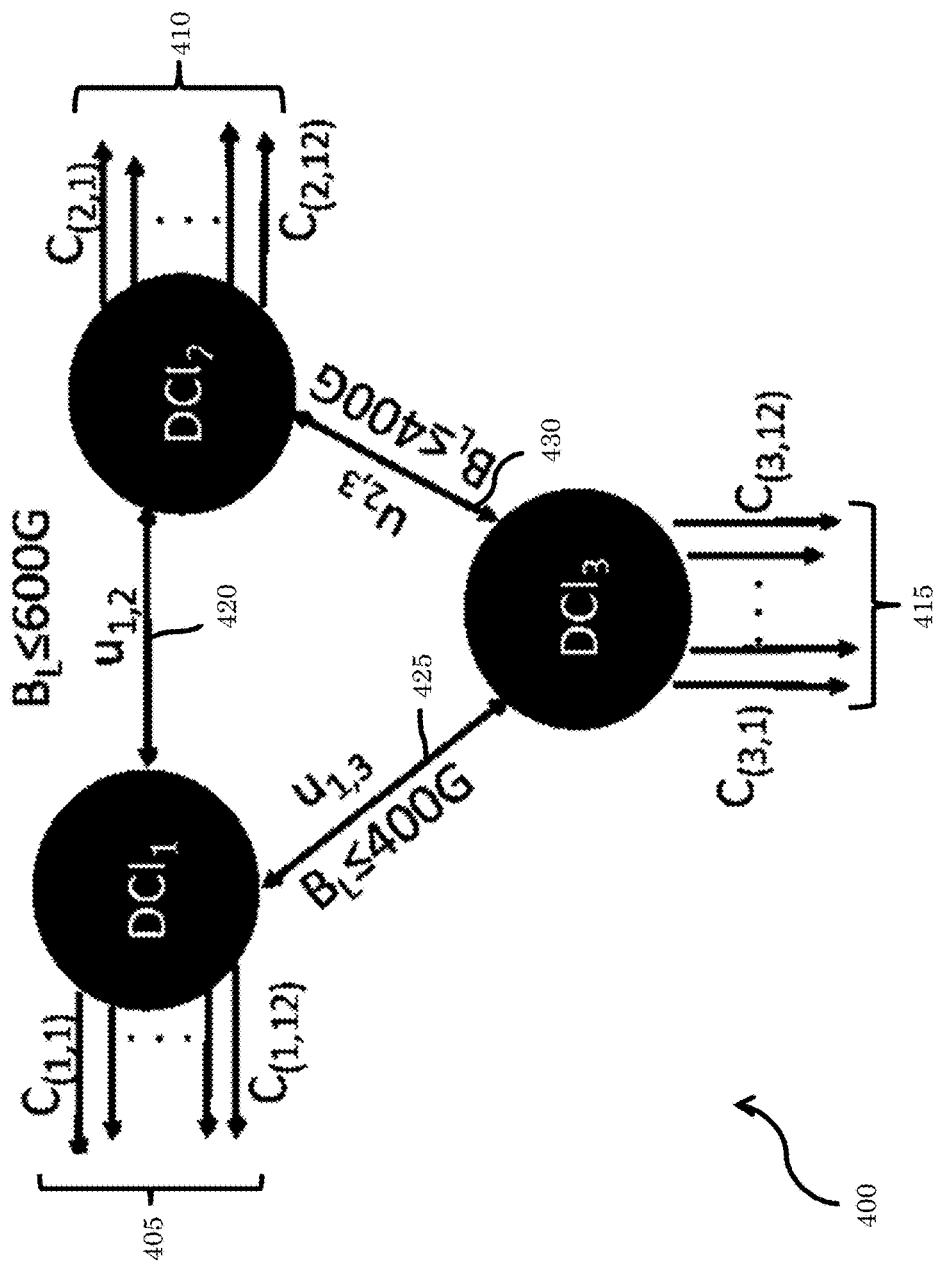
FIG. 4 is a block diagram showing a high level view of portions of the reference topology illustrated in FIG. 1.

An example of the technique described above can be applied to reference topology 100 FIG. 4 is a block diagram showing a high level view 400 of portions of reference topology 100, including a high level view of data center interconnect devices DCI1, DCI2, DCI3. Client side ports 405, 410 and 415 are shown for DCI1, DCI2, and DCI3 respectively, and line-side connections 420, 425, 430 are shown between the DCIs. Line-side connections 420, 425, and 430 represent connections over computer communications network 110.

In this example, each DCI includes 12 100G client side ports (i.e., each is capable of transmitting 100 gigabits per second), indicated by their capacity notation, $C(1,1)\ldots C(1,12)$, $C(2,1)\ldots C(2,12)$, and $C(3,1)\ldots C(3,12)$. The target inter-datacenter bandwidth requirement between DCI1 and DCI2 in this example is 600G (i.e., 600 gigabits per second). The target inter-datacenter bandwidth requirement between DCI1 and DCI3 is 400G, and the target inter-datacenter bandwidth requirement between DCI2 and DCI3 is 400G. In the figures, target inter-datacenter bandwidth is indicated using the variable $B_L$ on each line-side link.

It is assumed that computer communications network 110 includes technology that allows for line bandwidths between DCI1, DCI2, and DCI3 to be resized. For example, DCI1, DCI2, and/or DCI3 may include a DCI bandwidth resizing device. In order to calculate desired undersubscription factors for DCI1, DCI2, and DCI3, the techniques described above can be applied to the high level view 400 of reference topology 100.

Firstly, the initial target undersubscription factor u* is calculated based on the techniques discussed above. Because bandwidth allocation based on undersubscription requires reduced buffer size, the impact of various undersubscription factors on buffer size at the DCI can be visualized by plotting various undersubscription factors against the resulting required DCI switch buffer size to accommodate σ-percentile traffic for several values of σ. A M/M/1/B traffic queuing model and various selected undersubscription values can be used to generate the plot. This model and notation is standard, however it is noted that any other suitable model can be used to generate the values and plot.

Figure 5:
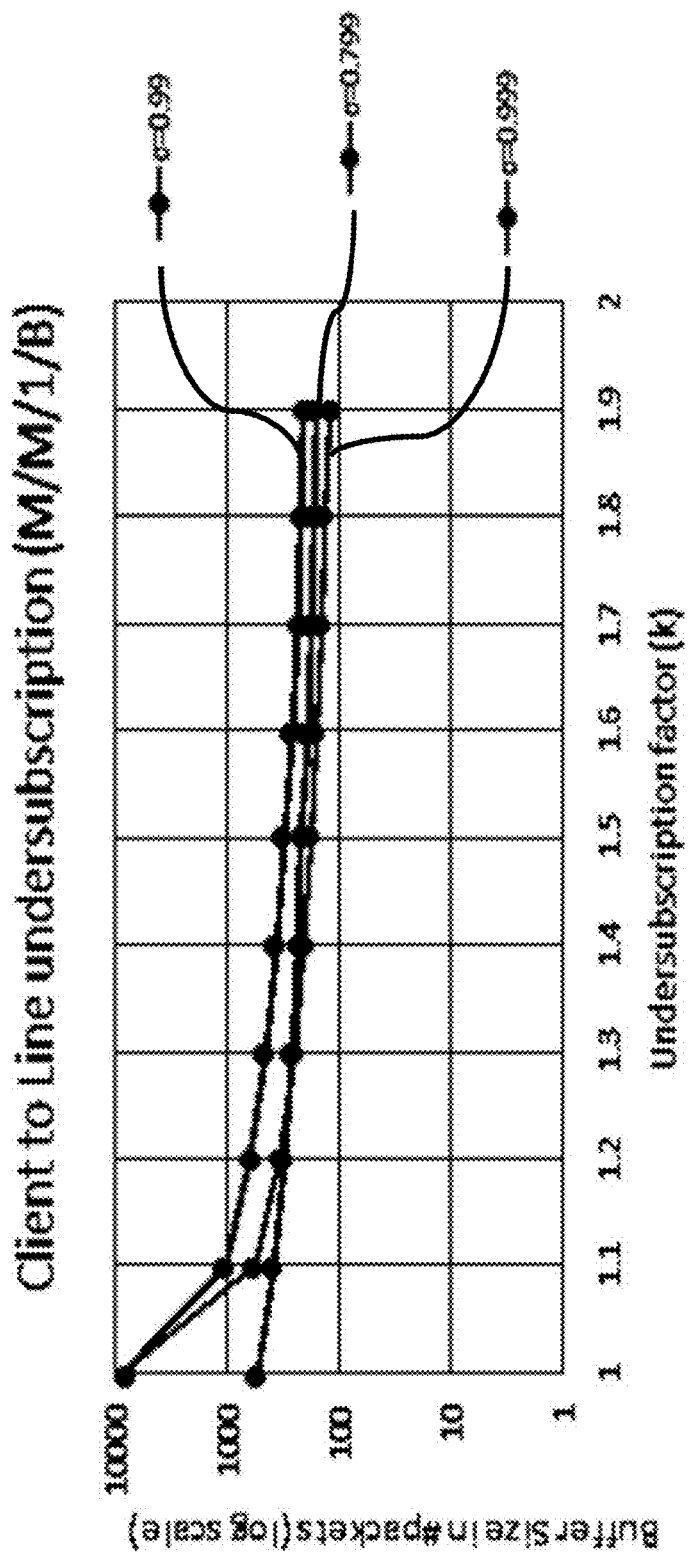
FIG. 5 is a line graph illustrating the required DCI switch buffer size for different undersubscription factors.

FIG. 5 is a line graph 500 illustrating the required DCI switch buffer size for undersubscription factors ranging from 1 to 2, for σ values of 0.799, 0.99, and 0.999. Although the step of calculating the initial target undersubscription factor u* can be performed canonically using the equations described above, for this example 1.3 can simply be selected as the target optimal undersubscription factor based on the plot of B(i,j,u,σ) shown in FIG. 5 with different values for σ (assuming a M/M/1/B traffic queuing arrival and service models, as known in the art, which denotes M exponential arrival rates/M exponential service rate/1 server/and a bounded buffer of length B following Kendall's notation). Increasing the undersubscription factor beyond 1.3 does not result in significant further improvement, while decreasing the undersubscription factor below 1.3 begins to increase the required buffer size significantly. It is noted that the buffer size is shown on a logarithmic scale in FIG. 5.

Secondly, the largest possible value undersubscription factor based on u* (e.g., 1.3) which is subject to the capacity constraints on each of the DCI devices is calculated using the techniques discussed above:

1. Corresponding to 3 pairs of DCI switches are 3 variables, $u_{1,2}, u_{1,3}, u_{2,3}$ 2. Initial set of constraints, $u_{1,2} \geq 1, u_{2,3} \geq 1, u_{1,3} \geq 1$, (Equation 15)

3. $A \leftarrow A \cup \{600u_{1,2} + 400u_{2,3} \leq 1200\}$ (Equation 16)

$A \leftarrow A \cup \{400u_{2,3} + 400u_{1,3} \leq 1200\}$ (Equation 17)

$A \leftarrow A \cup \{600u_{1,2} + 400u_{1,3} \leq 1200\}$ (Equation 18)

4. $600u_{1,2} \leq 1200; 400u_{2,3} \leq 1200; 400u_{1,3} \leq 1200$ (Equation 19)

5. Normalizing out the actual bandwidth values.

$$\text{Obj} \leftarrow \text{Min. } (u_{1,2}-1.3)^2 + (u_{2,3}-1.3)^2 + (u_{1,3}-1.3)^2 - u_{1,2} - u_{2,3} - u_{1,3}$$ (Equation 20)

Combining Steps 1-5:

$$u_{1,2}^2 + u_{2,3}^2 + u_{1,3}^2 - 2.6u_{1,2} - 2.6u_{2,3} - 2.6u_{1,3} + 5.07 - u_{1,2} - u_{2,3} - u_{1,3}$$ (Equation 21)

$600u_{1,2} + 400u_{2,3} \leq 1200$ (Equation 22)

$400u_{2,3} + 400u_{1,3} \leq 1200$ (Equation 23)

$600u_{1,2} + 400u_{1,3} \leq 1200$ (Equation 24)

$u_{1,2} \leq 1, u_{2,3} \leq 1, u_{1,3} \leq 1$, (Equation 25)

6. Solving this yields the desired undersubscription factors:

$u_{1,2}^* = 1.16363$, (Equation 26)

$u_{2,3}^* = 1.25454$, (Equation 27)

$u_{1,3}^* = 1.25454$ (Equation 28)

These desired undersubscription factors for each DCI can be used to resize the bandwidth between each DCI such that each DCI is undersubscribed in a manner consistent with its packet spraying constraints. In other words, the line side capacity for each DCI can be increased to minimize buffering, while accommodating the packet spraying constraints of the other DCIs (i.e., not overloading their inbound capacity with bits), using these factors. Thus, the bandwidth between DCI1 and DCI2 (which had a required bandwidth of 600G) can be increased to (600G)*(u*1,2)=600G*1.16363=698.178G, the bandwidth between DCI1 and DCI3 (which had a required bandwidth of 400G) can be increased to (400G)*(u*1,3)=400G*1.25454=501.816G, and the bandwidth between DCI2 and DCI3 can be increased to (400G)*(u*2,3)=400G*1.125454=501.816G.

Figure 6:
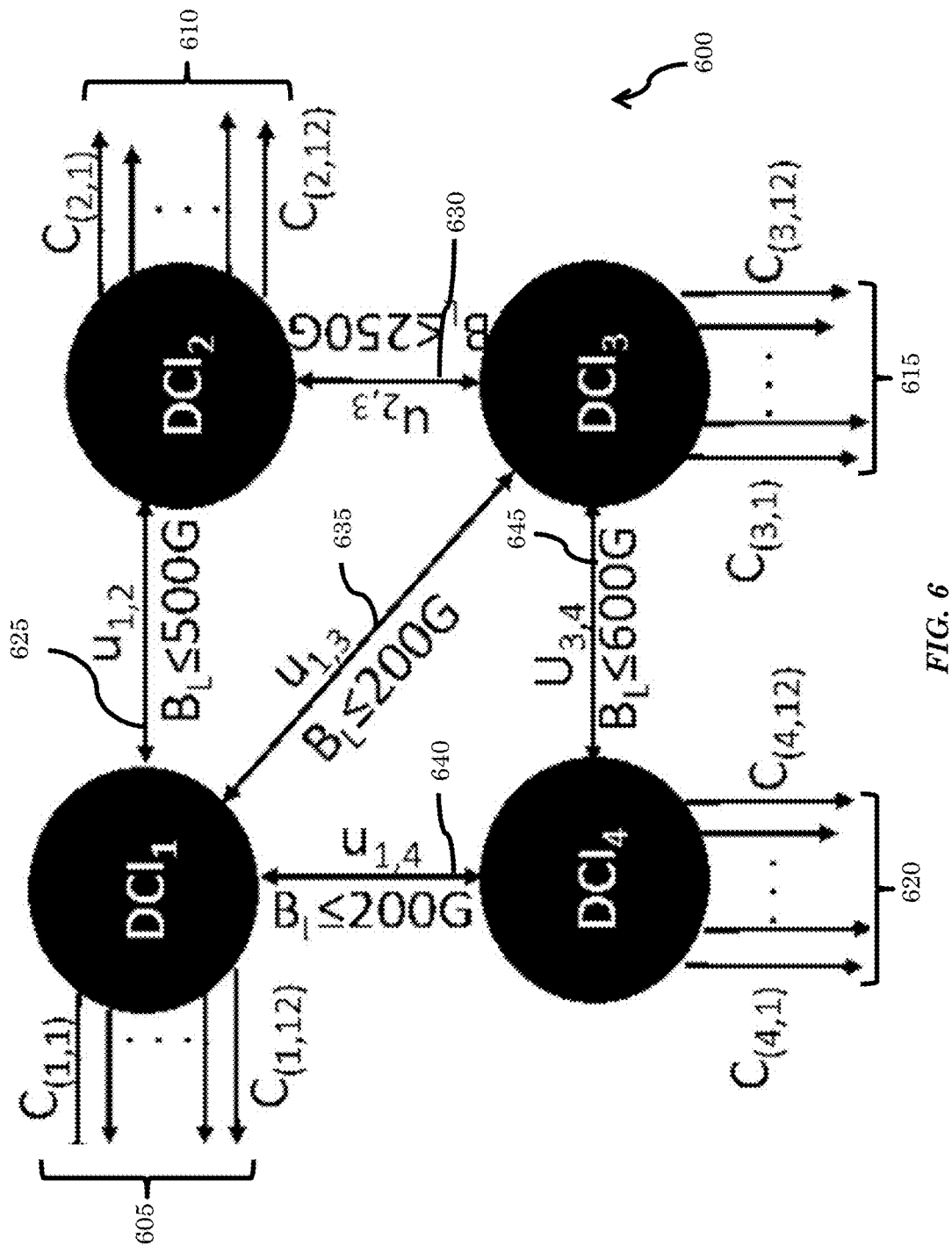
FIG. 6 is a block diagram showing a high level view of another example reference topology.

FIG. 6 is a block diagram showing a high level view of another example reference topology 600, including a high level view of data center interconnect devices DCI1, DCI2, DCI3, DCI4. In some implementations, reference topology 600 may be a reorganization of reference topology 100 with the inclusion of an additional DCI, additional connections, and new constraints. Client side ports 605, 610, 615 and 620 are shown for DCI1, DCI2, DCI3, and DCI4 respectively, and line-side connections 625, 630, 635, 640, and 645 are shown between the DCIs. Line-side connections 625, 630, 635, 640, and 645 represent connections over a computer communications network (such as computer communications network 110).

In this example, each DCI includes 12 100G client side ports (i.e., each is capable of transmitting 100 gigabits per second), indicated by their capacity notation, C(1,1) . . . C(1,12), C(2,1) . . . C(2,12), C(3,1) . . . C3,12), and C(4,1) . . . C4,12). The inter-datacenter bandwidth requirement between DCI1 and DCI2 in this example is 500G (i.e., 500 gigabits per second). The inter-datacenter bandwidth requirement between DCI1 and DCI3 is 200G, the target inter-datacenter bandwidth requirement between DCI2 and DCI3 is 250G, the inter-datacenter bandwidth requirement between DCI1 and DCI4 is 200G, and the inter-datacenter bandwidth requirement between DCI4 and DCI3 is 600G. It is noted that in this topology, there is no direct connection between DCI14 and DCI2. These bandwidth requirement values are shown in matrix 700 of FIG. 7. The matrix is indexed by DCI number. For example, the required bandwidth between DCI1 and DCI2 is 500G, as shown cross indexed by 2 and 1 in matrix 700, and also shown as $B_L$ with respect to line-side connection 625 as shown in FIG. 6.

It is assumed that the computer communications network includes technology that allows for line bandwidths between DCI1, DCI2, DCI3 and DCI4 to be resized. For example, DCI1, DCI2, and/or DCI3 may include a DCI bandwidth resizing device. In order to optimize the undersubscription factor for DCI1, DCI2, DCI3, and DCI4 the techniques described above can be applied to the reference topology 600.

Firstly, the initial target undersubscription factor u* is calculated based on the techniques discussed above. Because the goal of undersubscription is to minimize the buffer size, the impact of various undersubscription factors on buffer size at the DCI can be visualized by plotting various undersubscription factors against the resulting required DCI switch buffer size to accommodate o-percentile traffic for several values of σ.

For purposes of this example, the initial target undersubscription factor can be assumed to be 1.3 for purposes of this example, using a similar approach to the example described with respect to FIG. 5.

Secondly, the largest possible value undersubscription factor, based on u* (e.g., 1.3) is calculated, subject to the capacity constraints on each of the DCI devices, using the techniques discussed above:
Choosing a to be 100:

1. As connected, the 4 DCI switches in the figure correspond to 5 variables $u_{1,2}, u_{1,3}, u_{1,4}, u_{2,3}, u_{3,4}$  (Equation 29)

2. Initial set of constraints, $u_{1,2} \geq 1, u_{2,3} \geq 1, u_{1,3} \geq 1, u_{1,4} \geq 1, u_{3,4} \geq 1$,  (Equation 30)

3. $A \leftarrow A \cup \{u_{1,2}b_{1,2} + u_{1,3}b_{1,3} + u_{1,4}b_{1,4} \leq 1200\}$  (Equation 31)

$A \leftarrow A \cup \{u_{1,2}b_{1,2} + u_{2,3}b_{2,3} \leq 1200\}$  (Equation 32)

$A \leftarrow A \cup \{u_{1,3}b_{1,3} + u_{2,3}b_{2,3} + u_{3,4}b_{3,4} \leq 1200\}$  (Equation 33)

$A \leftarrow A \cup \{u_{1,4}b_{1,4} + u_{3,4}b_{3,4} \leq 1200\}$  (Equation 34)

4. $500u_{1,2} \leq 1200; 250u_{2,3} \leq 1200; 200u_{1,3} \leq 1200, 200u_{1,4} \leq 1200, 600u_{3,4} \leq 1200$  (Equation 35)

5. Obj←Min. $(u_{1,2}b_{1,2} - 1.3*500)^2 + (u_{2,3}b_{2,3} - 1.3*250)^2 + (u_{1,3}b_{1,3} - 1.3*200)^2 + (u_{1,4}b_{1,4} - 1.3*200)^2 + (u_{3,4}b_{3,4} - 1.3*600)^2 - 100(u_{1,2} + u_{2,3} + u_{1,3} + u_{1,4} + u_{3,4})$  (Equation 36)

Combining Steps 1-5:
Minimize:

$u_{1,2}^2 b_{1,2}^2 + u_{2,3}^2 b_{2,3}^2 + u_{1,3}^2 b_{1,3}^2 + u_{1,4}^2 b_{1,4}^2 + u_{3,4}^2 b_{3,4}^2 - 1300u_{1,2}b_{1,2} - 750u_{2,3}b_{2,3} - 1660u_{3,4}b_{3,4} - 620u_{1,4}b_{1,4} - 620u_{1,3}b_{1,3} + 1271725$  (Equation 37)

s.t.

$u_{1,2}b_{1,2} + u_{1,3}b_{1,4} + u_{1,4}b_{1,4} \leq 1200$  (Equation 38)

$u_{1,2}b_{1,2} + u_{2,3}b_{2,3} \leq 1200$  (Equation 39)

$u_{1,3}b_{1,3} + u_{2,3}b_{2,3} + u_{3,4}b_{3,4} \leq 1200$  (Equation 40)

$u_{1,4}b_{1,4} + u_{3,4}b_{3,4} \leq 1200$  (Equation 41)

$u_{1,2} \geq 1, u_{2,3} \geq 1, u_{1,3} \geq 1, u_{1,4} \geq 1, u_{3,4} \geq 1$,  (Equation 42)

Figure 8:
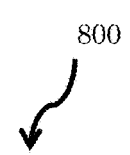
FIG. 8 is a matrix illustrating desired bandwidth requirement values for the example topology shown in FIG. 6.

Solving this yields the desired values reflected in FIG. 8. For example, the desired bandwidth calculated for the line-side connection between DCI1 and DCI2 is 694.375, as shown cross indexed by 2 and 1 in matrix 800.

These desired undersubscription factors for each DCI can be used to resize the bandwidth between each DCI such that each DCI is undersubscribed in a manner consistent with its packet spraying constraints. In other words, the line side capacity for each DCI can be increased to minimize buffering, while accommodating the packet spraying constraints of the other DCIs (i.e., not overloading their inbound capacity with bits), using these factors. Thus, multiplying each of the bandwidth requirement values shown in matrix 700 of FIG. 7 by the corresponding desired undersubscription factor calculated above yields the desired values shown in matrix 800 of FIG. 8, to which the bandwidth of each of these connections can be increased to minimize buffering.

The techniques above can be applied dynamically. For example, if the required line-side bandwidth for one or more links between DCIs changes, the desired undersubscription factors, and accordingly, the initial target and calculated desired values for bandwidth on the one or more links, can be updated. Recalculations can also be performed dynamically if any of the constraints change, such as a change in the number of ports C(x,y) (and/or their capacity) on one or more DCIs changes, if a DCI is added or removed, or if the required inter-datacenter bandwidth requirements change.

Figure 9:
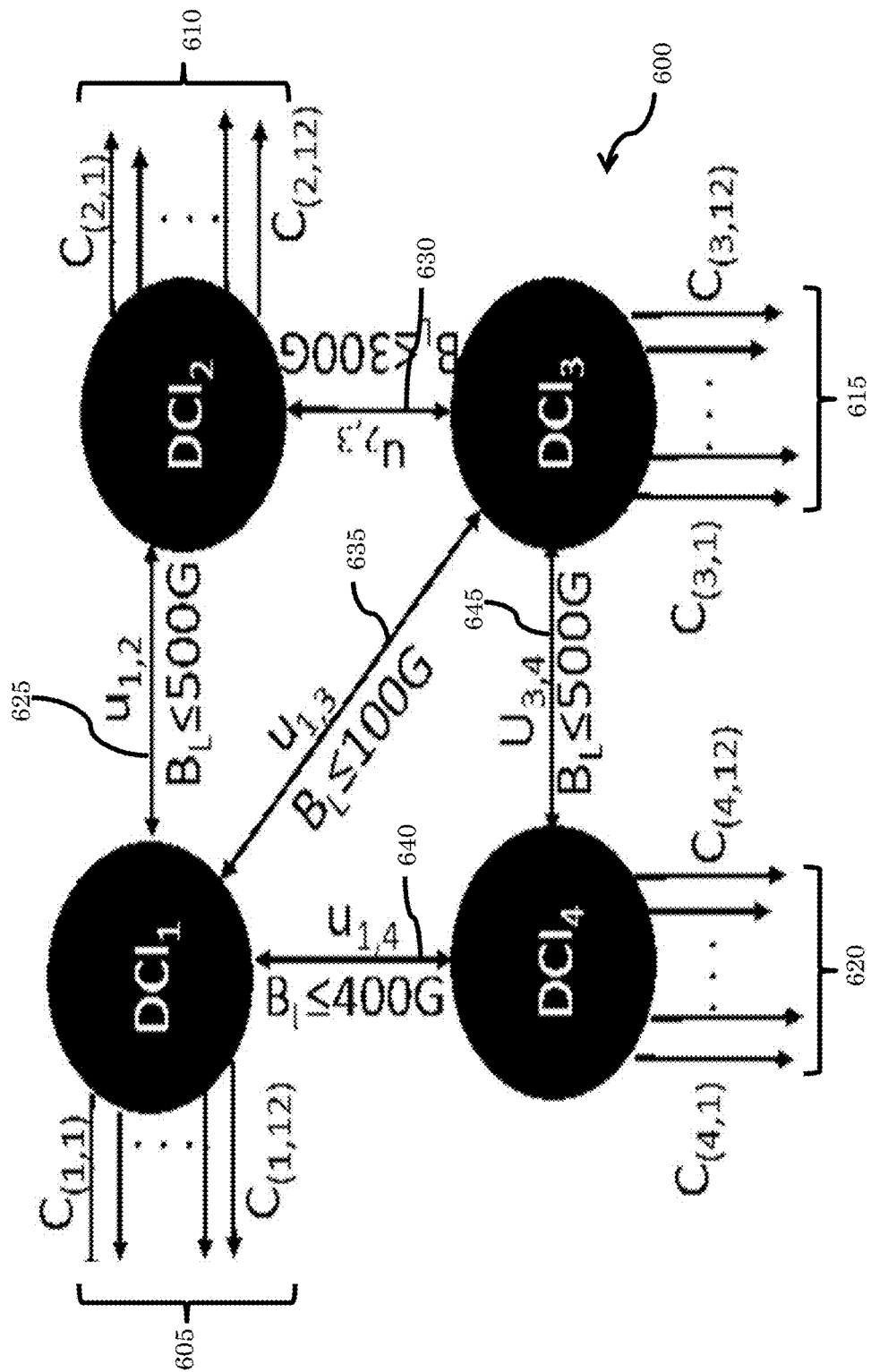
FIG. 9 is a block diagram illustrating the reference topology of FIG. 6, including different initial inter-datacenter bandwidth requirements.
Figure 10:
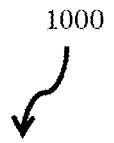
FIG. 10 is a matrix illustrating the initial bandwidth requirement values of FIG. 9.

For example, FIG. 9 is a block diagram showing reference topology 600, including inter-datacenter bandwidth requirements which are revised with respect to the values shown and described with respect to FIGS. 6, 7, and 8. These bandwidth requirement values are shown in matrix 1000 of FIG. 10. By updating these values in the calculations used to determine the desired undersubscription factors, new desired bandwidth values can be calculated. The new desired bandwidth requirement values based on the updated inter-datacenter bandwidth requirements of FIGS. 9 and 10 are shown in matrix 1100 of FIG. 11. For example, the required bandwidth between DCI2 and DCI3, shown cross-referenced by numbers 2 and 3 in matrices 700 and 1000, is updated from 250G to 300G. The desired bandwidth between DCI2 and DCI3, shown cross-referenced between numbers 2 and 3 in matrices 800 and 1100, is updated from 271.875 to 420G.

Figure 12:
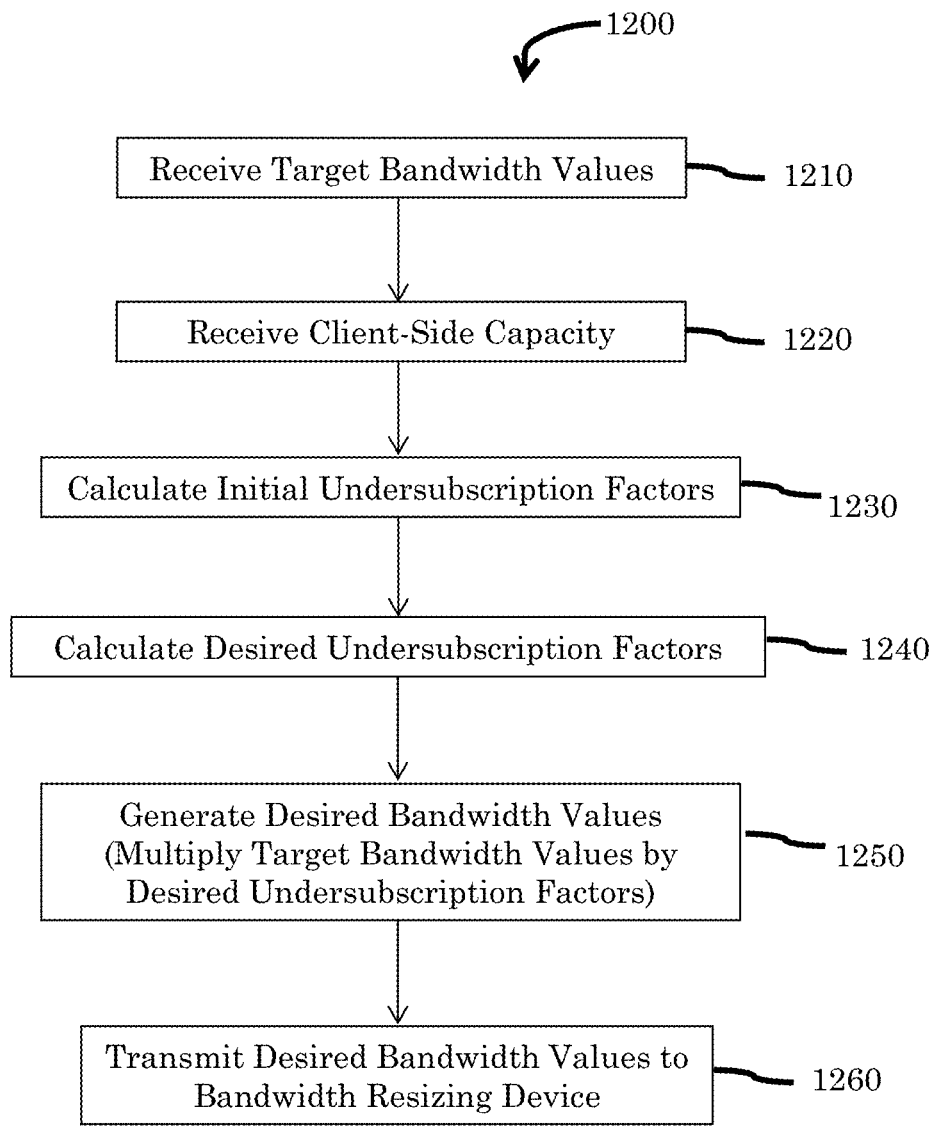
FIG. 12 is a flow chart illustrating an example method for generating and applying desired bandwidth requirement values.

FIG. 12 is a flow chart illustrating an example method 1200 for generating and applying desired bandwidth requirement values for a plurality of DCIs in communication over a computer communications network. The various steps of method 1200 may be carried out by a bandwidth management device, for example, which may include receiver/transmitter circuitry, processing circuitry, and memory which includes a non-transitory computer readable memory. The bandwidth management device may be in communication with the computer communications network and/or with devices connected thereto, such as DCI devices, or devices within a DC. Such bandwidth management device may be part of, or co-located with a DCI and/or DC. It is noted however that method 1200 may be carried out instead in a distributed fashion using a plurality of different devices located at different locations (e.g., at different DCIs or DCs). Various implementation arrangements are possible.

In step 1210, the bandwidth management device receives target bandwidth values for bandwidth between each pair of the plurality of DCI devices. The target bandwidth values may, for example, be supplied by a network designer via a client interface, may be estimated automatically by appropriate hardware and/or software e.g., based on network topology (in some implementations, the bandwidth management device may perform this function), or may be received in any other suitable manner via its receiver circuitry.

In step 1220, the bandwidth management device receives a client-side capacity value for each DCI device in any suitable manner via its receiver circuitry. Such capacity value may include a total bandwidth available on client-side ports, for example. The information may also include other information relating to client-side capacity, such as a topology of the DCI and/or DC, or a bi-section bandwidth of the DC. This information may be received from each DCI device, from a device in each corresponding DC, or from another device.

In step 1230, the bandwidth management device calculates initial undersubscription factors for each pair of DCIs according to the techniques described herein based on the target bandwidth values.

In step 1240, the bandwidth management device calculates desired undersubscription factors according to the techniques described herein for each pair of DCIs based on the initial undersubscription factors and the received client-side capacity values.

In step 1250, the bandwidth management device generates desired bandwidth values by weighting (e.g., multiplying) the received target bandwidth values by the calculated optimized undersubscription factors.

In step 1260, the bandwidth management device transmits the desired bandwidth values to one or more bandwidth resizing devices situated on the network and configured to resize the bandwidth between pairs of the DCI devices based on the received optimized bandwidth value or values. In some networks, all pairs of DCI devices may be connected and these connections may be resized accordingly. In other networks, only some pairs of DCI devices may be connected, and those connections may be resized accordingly.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising, in a network with a plurality of switches, each switch having client side ports and line side ports:
    receiving a required line-side capacity value for each link between connected pairs of the plurality of switches;
    receiving a client-side capacity value for each of the plurality of switches;
    calculating an initial undersubscription factor based on the required line-side capacity values and the client-side capacity values, the undersubscription factor indicating a ratio of line-side capacity to client-side capacity;
    calculating a desired undersubscription factor for each of the plurality of switches based on the initial undersubscription factor and the client side capacity values;
    calculating a desired line-side capacity value for said each link between said connected pairs of the plurality of switches based on the required line-side capacity values and the desired undersubscription factors; and
    resizing a line-side capacity of at least one of the links between connected pairs of the plurality of switches based on the desired line-side capacity value.

2. The method of claim 1, wherein resizing the line-side capacity of at least one of the links between connected pairs of the plurality of switches comprises transmitting at least one of the desired line-side capacity values to a bandwidth resizing device to cause the bandwidth resizing device to resize the line-side capacity allocated in the network between at least one of the pairs of switches.

3. The method of claim 1, further comprising including receiving an indication of a topology of each switch corresponding to the client-side capacity value.

4. The method of claim 2, wherein the bandwidth resizing device comprises a wavelength division multiplexer.

5. The method of claim 1 wherein at least a portion of the method is carried out by a bandwidth management device.

6. The method of claim 5, wherein the bandwidth management device comprises or is co-located with a switch.

7. The method of claim 1, wherein at least a portion of the method is carried out by a plurality of bandwidth management devices.

8. A bandwidth management device comprising:
    processing circuitry;
    receiver circuitry in communication with a computer communications network configured to receive a required line-side capacity value for each link between connected pairs of a plurality of switches;

the receiver circuitry further configured to receive a client-side capacity value for each switch;

the processing circuitry configured to calculate an initial undersubscription factor based on the required line-side capacity values and the client-side capacity values, the undersubscription factor indicating a ratio of line-side capacity to client-side capacity;

the processing circuitry further configured to calculate a desired undersubscription factor for each switch based on the initial undersubscription factor and the client side capacity values;

the processing circuitry further configured to calculate a desired line-side capacity value for each link between connected pairs of the plurality of switches based on the required line-side capacity values and the desired undersubscription factors; and the processing circuitry further configured to resize a line-side capacity of at least one of the links between connected pairs of the plurality of switches based on the desired line-side capacity value.

9. The bandwidth management device of claim 8, further comprising transmitter circuitry configured to transmit at least one of the desired line-side capacity values to a bandwidth resizing device to cause the bandwidth resizing device to resize the line-side capacity allocated in the network between at least one of the pairs of switches.

10. The bandwidth management device of claim 8, wherein the receiver circuitry is further configured to receive an indication of a topology of each switch corresponding to the client-side capacity value.

11. The bandwidth management device of claim 9, wherein the bandwidth resizing device comprises a wavelength division multiplexer.

12. The bandwidth management device of claim 9, wherein the transmitter and receiver circuitry are further configured to communicate with another bandwidth management device.

13. The bandwidth management device of claim 12, wherein the bandwidth management device comprises or is co-located with a switch.

14. The bandwidth management device of claim 8, wherein the bandwidth management device comprises circuitry distributed among several data center interconnect devices.

15. A non-transitory computer readable medium on which instructions are stored which when executed by a processor of a network device in a network with a plurality of switches, each side having client side ports and line side ports, cause the network device to:

receive a required line-side capacity value for each link between connected pairs of the plurality of switches;

receive a client-side capacity value for each switch;

calculate an initial undersubscription factor based on the required line-side capacity values and the client-side capacity values, the undersubscription factor indicating a ratio of line-side capacity to client-side capacity;

calculate a desired undersubscription factor for each switch based on the initial undersubscription factor and the client side capacity values;

calculate a desired line-side capacity value for each link between connected pairs of the plurality of switches based on the required line-side capacity values and the desired undersubscription factors; and resize a line-side capacity of at least one of the links between connected pairs of the plurality of switches based on the desired line-side capacity value.

16. The non-transitory computer readable medium of claim 15, wherein resizing the line-side capacity of at least one of the links between connected pairs of the plurality of switches comprises transmitting at least one of the desired line-side capacity values to a bandwidth resizing device to cause the bandwidth resizing device to resize the line-side capacity allocated in the network between at least one of the pairs of switches.

17. The non-transitory computer readable medium of claim 15, further comprising instructions which when executed by the processor cause the network device to receive an indication of a topology of each switch corresponding to the client-side capacity value.

18. The non-transitory computer readable medium of claim 16, wherein the bandwidth resizing device comprises a wavelength division multiplexer.

19. The non-transitory computer readable medium of claim 16, wherein the bandwidth management device comprises or is co-located with a switch.

20. The non-transitory computer readable medium of claim 15, further comprising instructions which when executed by a processor of a network device cause the network device to transmit a plurality of messages each including at least one of the desired line-side capacity values for one of the pairs of switches to a different bandwidth resizing device such that each of the bandwidth resizing devices are caused to resize the bandwidth allocated in the network between at least one of the pairs of switches.

* * * * *